United States Patent [19]

Denz

[11] Patent Number: 5,452,626
[45] Date of Patent: Sep. 26, 1995

[54] PROCESS AND DEVICE FOR THE AUTOMATIC ADJUSTMENT OF ROTATIONAL SPEED RATIOS BETWEEN OPERATING ELEMENTS OF A DRAW FRAME

[75] Inventor: Peter Denz, Hohenwart, Germany

[73] Assignee: Rieter Ingolstadt Spinnereimaschinenbau AG, Ingolstadt, Germany

[21] Appl. No.: 204,638

[22] Filed: Mar. 2, 1994

[30] Foreign Application Priority Data

Mar. 12, 1993 [DE] Germany .......................... 43 07 839.7

[51] Int. Cl.$^6$ ................................. G05D 13/66
[52] U.S. Cl. ........................ 74/665 L; 74/665 N
[58] Field of Search ............................ 74/665 N, 665 L

[56] References Cited

U.S. PATENT DOCUMENTS

| | | |
|---|---|---|
| 4,847 | 11/1846 | Pray et al. . |
| 7,165 | 3/1850 | Hayden . |
| 7,919 | 1/1851 | Wyllys . |
| 68,741 | 9/1867 | Herrschaft . |
| 86,719 | 2/1869 | Whitton . |
| 110,556 | 12/1870 | Draper . |

(List continued on next page.)

FOREIGN PATENT DOCUMENTS

| | | |
|---|---|---|
| 0411379A1 | 7/1989 | European Pat. Off. . |
| 1195177 | 11/1959 | France . |
| 1237428 | 6/1960 | France . |
| 720200 | 4/1942 | Germany . |
| 1097328 | 1/1961 | Germany . |

(List continued on next page.)

OTHER PUBLICATIONS

"A Survey of Autolevelling At The Drawframe" by David J. Goetzinger, Dec. 1, 1976.
"Design, Construction, and Performance of Saco–Lowell/ Uster Versa–Matic ADC Draw Frame", by Paul B. West, Jun. 1, 1960.
"Saco–Lowell Uster Versamatic Automatic Draw Frame Draft Control".
"Platt Group Bulletin" vol. 11, No. 3, Autolevelling At The Drawframe.
"Automatic Eveners: What They Do, How They Work" by Dr. Hugh M. Brown, Textile World, Feb., 1966.
"Simulation of a Textile Machine Process Control System", Atomic Weapons Research Establishment AWRE Report No. 0–71/66, by K. G. Beauchamp, Oct., 1966.
"Draw Frame With Servo Controlled Draft" Saco–Lowell Shops, Boston, U.S.A.
Electronics in Textile Machines–Carding Machine Control, Industrial Electronics, May, 1965.
German Search Report.
European Search Report with Translation.

*Primary Examiner*—Dirk Wright
*Attorney, Agent, or Firm*—Dority & Manning

[57] ABSTRACT

Process and device are provided for the automatic adjustment of the rotational speed ratios among the operating elements of a draw frame.

The invention utilizes a drive for a draw frame which is less expensive and at the same time achieves a higher degree of automation and precision for the adjustment of the rotational speed ratios between the operating elements. The total required power to be supplied to the operating elements of a draw frame is divided up between a main motor and several separate motors. The distribution of the required power capacity is such that the main motor delivers a constant required power which represents the major part of the total required power. All the separate motors which deliver selectively variable required power, together furnish the lesser share of the total required power. According to the device, the mechanical gear coupling of all operating elements among each other is at the same time coupled to individual drives for all operating elements.

13 Claims, 2 Drawing Sheets

U.S. PATENT DOCUMENTS

| | | |
|---|---|---|
| 117,098 | 7/1871 | Moon . |
| 164,452 | 6/1875 | Herschaft . |
| 216,630 | 6/1879 | Reilley . |
| 278,488 | 5/1883 | Ayers . |
| 284,585 | 9/1883 | Whitehead . |
| 352,701 | 11/1886 | Matteson . |
| 387,701 | 8/1888 | Upton . |
| 389,695 | 9/1888 | Evans . |
| 392,172 | 10/1888 | Wilkins . |
| 447,200 | 2/1891 | Peirce . |
| 449,477 | 3/1891 | Hildreth . |
| 466,410 | 1/1892 | Hadfield . |
| 565,084 | 8/1896 | Mathewson . |
| 655,934 | 8/1900 | Mathewson . |
| 690,596 | 1/1902 | Mathewson . |
| 786,242 | 3/1905 | Westcott et al. . |
| 887,281 | 5/1908 | Smith . |
| 1,111,290 | 9/1914 | Birch et al. . |
| 1,132,316 | 3/1915 | Eves . |
| 1,594,395 | 8/1926 | Weston . |
| 2,141,003 | 3/1936 | King et al. . |
| 2,407,100 | 9/1946 | Richardson . |
| 2,681,475 | 6/1954 | Raper . |
| 2,746,093 | 5/1956 | Raper . |
| 2,810,936 | 10/1957 | Altenburger . |
| 2,890,494 | 6/1959 | Raper . |
| 2,891,287 | 6/1959 | Raper . |
| 2,930,084 | 3/1960 | Sanborn et al. . |
| 2,950,508 | 8/1960 | Locher . |
| 2,964,803 | 12/1960 | Robinson . |
| 2,981,986 | 5/1961 | Neil . |
| 3,016,460 | 1/1962 | Andresen . |
| 3,074,300 | 1/1963 | Justus . |
| 3,099,048 | 7/1963 | Locher . |
| 3,113,350 | 12/1963 | Selby . |
| 3,244,863 | 4/1966 | Paterson . |
| 3,246,916 | 8/1966 | Owen . |
| 3,314,114 | 4/1967 | Wyatt . |
| 3,416,051 | 12/1968 | Pinto et al. . |
| 3,440,690 | 4/1969 | Greenwood et al. . |
| 3,557,615 | 1/1971 | Seymour, Jr. et al. . |
| 3,703,023 | 11/1972 | Krauss et al. . |
| 3,768,122 | 10/1973 | Rauch . |
| 3,795,851 | 3/1974 | Gage et al. . |
| 3,822,590 | 7/1974 | Tharpe et al. . |
| 3,827,106 | 8/1974 | Varga . |
| 3,862,473 | 1/1975 | Felix et al. . |
| 3,869,759 | 3/1975 | Savageau et al. . |
| 3,885,232 | 5/1975 | Goto . |
| 3,925,850 | 12/1975 | Lytton . |
| 3,938,223 | 2/1976 | Grice . |
| 4,030,082 | 6/1977 | Goto . |
| 4,030,635 | 6/1977 | Hablutzel et al. . |
| 4,051,722 | 10/1977 | Feller . |
| 4,099,297 | 7/1978 | Hasegawa et al. . |
| 4,137,487 | 1/1979 | Niestroj et al. . |
| 4,163,927 | 8/1979 | Grice, Jr. . |
| 4,369,550 | 1/1983 | Meile . |
| 4,512,061 | 4/1985 | Hartmannsgruber et al. . |
| 4,653,153 | 3/1987 | Felix et al. . |
| 4,974,296 | 12/1990 | Vidler . |
| 5,018,248 | 5/1991 | Haworth et al. . |
| 5,230,125 | 7/1993 | Clement et al. . |

FOREIGN PATENT DOCUMENTS

| | | |
|---|---|---|
| 1287484 | 9/1969 | Germany . |
| 1588611 | 8/1974 | Germany . |
| 2331217 | 1/1975 | Germany . |
| 3621520A1 | 2/1987 | Germany . |
| 3827693A1 | 2/1990 | Germany . |
| 3706513C2 | 7/1991 | Germany . |
| 989056 | 3/1975 | Italy . |
| 401758 | 2/1974 | U.S.S.R. . |
| 1144 | of 1860 | United Kingdom . |
| 3962 | of 1873 | United Kingdom . |
| 779197 | 7/1957 | United Kingdom . |
| 855949 | 12/1960 | United Kingdom . |
| 891321 | 3/1962 | United Kingdom . |
| 979346 | 1/1965 | United Kingdom . |
| 1135752 | 12/1968 | United Kingdom . |
| 1436029 | 5/1976 | United Kingdom . |
| 1443258 | 7/1976 | United Kingdom . |
| 2062037 | 5/1981 | United Kingdom . |
| 2081758 | 2/1982 | United Kingdom . |

PROCESS AND DEVICE FOR THE AUTOMATIC ADJUSTMENT OF ROTATIONAL SPEED RATIOS BETWEEN OPERATING ELEMENTS OF A DRAW FRAME

BACKGROUND OF THE INVENTION

The present invention relates to a process and device for the adjustment of rotational speed ratios between the operating elements of a draw frame. The rotational speed ratios are ruled and determined by the drive and the transmission in relation to the operating elements of the draw frame.

The operating elements of a draw frame are conventionally understood to be:

the roller pairs at the feeder frame, the roller pair at the feeder table preceding the draw frame the roller feeler pair used as a measuring element the pair of calender rollers following the draw frame the rotary plate the can plate The listed operating elements are mentioned in a sequence which corresponds to their sequence in the direction of movement of the fiber sliver material. The most important elements in adjusting the rotational speed ratios on a draw frame are the roller pairs of the draw frame, i.e. the rotational speed ratios of the other operating elements are determined on the basis of the rotational speed ratio settings at these operating elements. The most important factor is the adjustment of the rotational speed ratio among the roller pairs of a draw frame.

The draw frames in most general use as a rule consist of several roller pairs between which the textile sliver is conveyed. It is characteristic that most draw frames have so many roller pairs that at least one preliminary drafting zone and one main drafting zone are formed. Each roller pair is driven by its lower roller. The draw frame is preceded by a roller feeler pair and is followed by a calender roller pair. The original form of the drive of the operating elements of a draw frame consisted of a main motor, with the rotational speed ratios of the different operating elements among each other being achieved by means of an intercalated gearing (used as a transmission). The rotational speed ratios between all the operating elements were thus rigidly set and could only be changed by replacing the replaceable rollers of the gearing.

A further development in the drive of the roller pairs of a draw frame, for example, is described in EP 376 002 for a draw frame with three roller pairs. Hereinafter, "drive" is understood to be the unit consisting of a motor and transmission. Due to differences in sliver thickness, the rotational speed ratio between central roller and delivery roller is changed, i.e. the main draft is changed and is thus adapted to the changed sliver thickness. The device has the decided disadvantage that interferences such as an electrical power outage or interference in the transmission between the main motor and the central rollers or input rollers result in a deviation in the subsequent rotational speed ratio between central roller and delivery roller. These interferences in the rotational speed ratios cannot be avoided. Load peaks of longer duration, e.g. at the input roller pair, caused by short thick places in the fiber material interfere with the synchronism of said rotational speed ratio because the feedback reactions do not have a uniform effect on all the roller pairs but are limited only to the central and input roller pair.

Furthermore, it is disadvantageous that no position adjustment that would be true to the angle of rotation exists between delivery roller pair and central roller pair. This disadvantage becomes apparent when the draw frame is stopped. In stopping the draw frame, asynchronism in the rotational speed ratio between delivery roller pair occurs, caused by the inertia of the gearing which twists the central roller in relation to the delivery rollers. In today's draw frames which run at very high speeds, this situation takes on a great importance in affecting the length of fiber sliver produced per second.

Another development in the drive of draw frames is characterized by the utilization of an "electric shaft" in the draw frame. A characteristic solution for the utilization of the "electric shaft" is found in DE-OS 29 41 612. Each roller pair is driven directly by one single drive. There is no mechanical gearing between the roller pairs.

Based on the fundamental principle, the solution according to EP 411 379 proposes to unite similar individual drives into drive groups. Thus, separate drive groups which are independent of each other are provided. An individual drive is to be provided for each independent drive group of a drafting zone, or as required also of a conveying or transportation segment or any other operating stations connected in the process. The "electric shaft" principle is maintained. The precision of the drives is to be improved by using position adjusters which are true to angles of rotation. It is a disadvantage here that the servomotors must possess a high electric capacity and great precision in rotational speed and are very expensive for that reason.

The technical solution according to EP 411 379 advantageously eases the load of the central computer by means of a subdivision into a main and at least one auxiliary control and reduces the danger of high surges occurring in the main controls (EP 411 379, column 5, lines 27–31). This solution cannot, however, prevent the drive motors of the different drive groups from deviating in rotational speed ratio among each other. This may be caused by suddenly occurring errors in the textile fiber sliver, for instance. EP 411 379 therefore proposes to install control connections between the auxiliary controls in order to detect deviations in the rotational speed ratio of individual drive motors among each other and to correct such deviations.

The solution according to EP 411 379 is finally very costly and expensive since every individual drive must function very precisely. If the necessary mechanical performance to be furnished and the size of the motors and of their electronic elements are taken into account it clearly appears that additional problems of space requirement and air-conditioning of the electronic elements in keeping with the size of the spinning room exist. Considering the dynamic aspects of the individual drives, it is clear that when load changes occur suddenly or in case of load peaks, e.g. due to the entry of thick places in the fiber sliver, it becomes very difficult or is in part or entirely impossible to maintain precise rotational speed ratios or to prevent brief rotational speed collapses due to momentary peaks. To be able to compensate these rotational-speed collapses rapidly and effectively with the necessary torque, the electric drive motors are generally over-sized with respect to their capacity requirements.

Individual drives with this "electric shaft" have furthermore the disadvantage with respect to adjustment that desired-value deviations are of different importance. The correction of small deviations in the desired value requires the utilization of an expensive servo-adjuster by contrast to the correction of great deviations in the desired value.

The achievement of a basic draft, e.g. 8 times, requires a rotational speed ratio of 800% between two draw-frame shafts. The desired value of the voltage changer of the slow motor is therefore only ⅛ of the desired value of the guiding drive. To ensure that the adjustment precision is not considerably impaired in this case, an expensive drive of much higher precision (8 times) than inexpensive standard drives must be used.

The following situation is also disadvantageous:

Changes in percentage of drafting result in a modification of the setting signal, i.e. a fine draft has a very weak setting signal as a result. This is a problem, as the precision of synchronization of the rotational speed ratios suffers when very low signal magnitudes are used for the setting signal.

OBJECTS AND SUMMARY OF THE INVENTION

It is a principal object of the invention to use a drive for a draw frame which is less expensive and at the same time achieves greater automation and precision for the setting of the rotational speed ratios among the operating elements. Additional objects and advantages of the invention will be set forth in part in the following description, or may be obvious from the description, or may be learned by practice of the invention.

It is an essential characteristic of the process according to the invention that the required power transmitted to an operating element is the result of the superimposition of two provided required powers, whereby one of the required powers is supplied constantly and the other required power can be supplied at the same time and is optionally variable. The optionally variable required power is superimposed on the constant required power so that a resulting required power is provided to such an extent that constant rotational speed ratios can be ensured among the operating elements. This adjustment of the resulting required power in relation to an operating element is therefore automatic.

The total required power relative to the operating elements of a draw frame is divided up among a main motor and several separate motors. The distribution of the required powers is such that the main motor supplies a constant required power which represents the major part of the entire required power. All separate motors which supply optionally variable required powers, supply together the lower share of the entire required power. A separate motor is connected to a planet or cycloid gear and is assigned to an operating element. The separate motor is advantageously a servomotor.

Since the required power is physically connected to the rotational speed and torque, it is possible to react to disturbances in drafting through the change in rotational speed. In this manner, a change in rotational speed on the corresponding operating element makes it possible to maintain the required rotational speed ratios among the operating elements.

According to the process, two rotational speeds are always superimposed with respect to an individual operating element, so that the resulting rotational speed acts upon the operating element in question. According to the process, the basic rotational speed ratio between the individual operating elements is set by selecting the mechanical transmission from main motor to drive wheel of the planet or cycloid gear or by the transmission within the gearing. By changing the rotational speed and/or the direction of rotation of the individual servomotors, the basic rotational speed provided for the operating elements is superimposed by a lowered or increased rotational speed of the servomotor, so that a resulting rotational speed acts upon the operating element. In this manner, it is possible to correct automatically deviations between the rotational speed ratios of the operating elements and to adjust again to the desired rotational speed ratio. Since the servomotors can be controlled, control servomotors are involved here but are called servomotors for the sake of simplification.

The transmission ratio of the planet or cycloid gear is set so that the adjusting range of the servomotor is a multiple of the adjusting range of the rotational drive speed of the indicated gear. It is thereby possible for the precision of the rotational speed resolution of the servomotor to be proportionally poorer without affecting the overall precision of the rotational speed adjustment. The resulting advantage is that a servomotor with poorer resolution of the precision of rotational speed can be used. This has a cost-saving effect on the design of the drive without affecting the overall precision. The transmission ratio of the planet or cycloid gear is set so that the resolution of precision of the setting signal of the servomotor may be proportionally poorer than in the individual drives without affecting the overall precision as a result. This also applies to the precision of the desired value.

The transmission ratio of the planet or cycloid gear is furthermore set so that load changes or rapid load changes have a feed-back effect on the rotational speed of the servomotor that is lower in proportion to the transmission ratio. This results in the advantage that fewer dynamic servomotors, and thereby less expensive servomotors, can be used.

It is an inventive characteristic of the device according to the invention that the mechanical gear coupling of all operating elements among each other is coupled at the same time to individual, separate motors for all operating elements.

According to the present device, each operating element can be coupled to the drive shaft of the corresponding planet or cycloid gear. On the other hand the corresponding drive shafts of the planet or cycloid gears are connected to a single central main motor. Each shaft of the sun gear of the planet or cycloid gears is connected to a separate drive. The separate drive may be a servomotor functioning, depending on its role in the device, as a control-servomotor. A signal of an adjustment to fiber sliver thickness may release a setting signal for the appertaining control-servomotor. The control-servomotor can then change rotational speed and/or sense of rotation.

The device establishes the basic rotational speed ratio among the individual operating elements in relation to each other. This determination is effected through the selection of the mechanical transmissions from the main motor to the drive wheel of the planet or cycloid gear or of the transmission within the gear.

The adjustment range of the basic rotational speed ratios is realized by the control-servomotors. This has the advantage that even when rotational speeds drop or load peaks occur, the set rotational speed ratio is maintained, since the disturbance affects all the roller pairs simultaneously and to the same extent.

It is an additional characteristic of the invention that the main motor produces the basic force to operate the draw frame while it imposes the basic rotational speed ratios mechanically. The servomotors with their considerably lower drive capacity are used in order to:

compensate immediately and precisely for rotational speed ratio drops, render the basic rotational speed ratio continuously adjustable and fixable within relatively wide margins.

Since each planet or cycloid gear is provided with its own servomotor, the required power of each individual roller pair is staggered in a required power supplied by the main motor and by a share to be supplied by the servomotor of the planet or cycloid gear. This has a noticeably favorable effect on the sizing and cost of the electric motors to be used. The share of force of the servomotor becomes relatively small by comparison to the main motor, whereby the main motor may be an asynchronous motor. The required servomotor is therefor extremely inexpensive (also by comparison to the classical "electric shaft") and makes it possible to reduce costs in driving the draw frame.

As a result of the servomotors being coupled to the planet or cycloid gears, low dynamic requirement need be imposed on the servomotors since load peaks are absorbed by the inertia mass of the planet or cycloid gear. The costs of the required planet or cycloid gear can also be reduced since the forces to be transmitted are relatively weak and the market offers very low-cost and nevertheless robust and reliable gearing with high effectiveness.

The resolution is improved due to the reduction of the rotational speed of the servomotor from the operating speed of the planet or cycloid gear, i.e. errors in rotational speed, ballistic effects, waviness, etc. of the servomotor rotational speed are reduced in proportion to the reduction ratio. This results in a high degree of precision in the rotational speed behavior, even though servomotors of a low-precision class are used.

By applying the stopping brake to the servomotors, the machine can still be operated with basic transmission if the servomotor were defective. The brake furthermore ensures mechanical synchronism in the stoppage of the draw frame, so that irregularities in the uniformity of the fiber slivers due to the release of tension in the stretched fiber slivers are prevented in stoppage.

The instant invention provides savings and nevertheless increases precision in the rotational speed ratio while ensuring a high degree of operating safety. The precision of synchronism in rotational speed behavior which is achieved among the operating elements makes it possible to raise the degree of automation to a great extent, e.g. drafting can be adjusted easily on a draw frame where the rotational speed ratio between two roller pairs following each other is very low.

An embodiment of the invention is shown in the drawings and is described in greater detail below.

Figure 1:
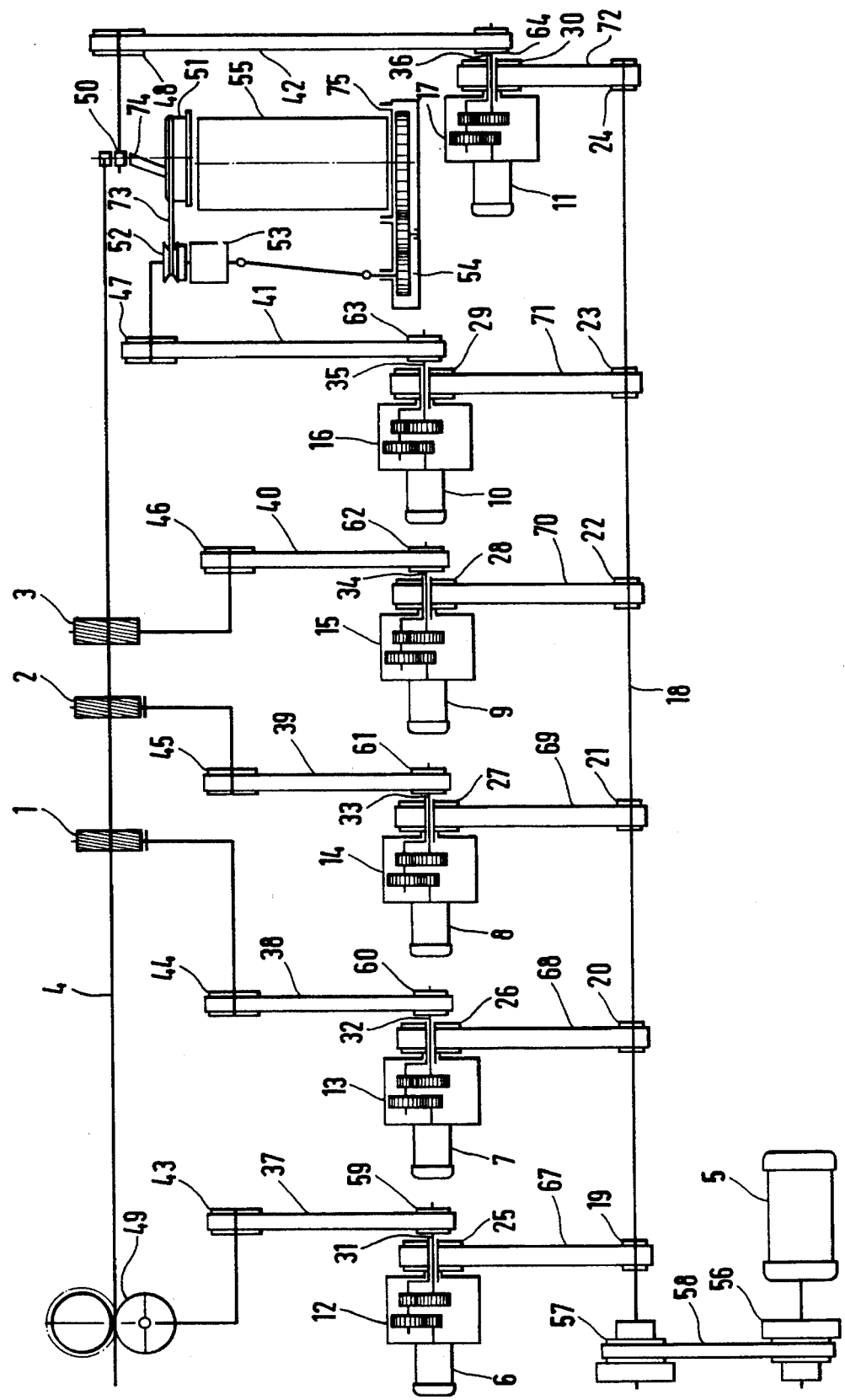
FIG. 1 shows a device for automatic drafting adjustment on a draw frame.

The invention is explained below through the drawings with respect to structure and effect of the shown invention. Drafting is determined by the rotational speed ratios among the roller pairs of a draw frame.

DETAILED DESCRIPTION OF THE PREFERRED EMBODIMENTS

Reference will now be made in detail to the presently preferred embodiments of the invention, one or more examples of which are illustrated in the drawings. Each example is provided by way of explanation of the invention, not as a limitation of the invention. The numbering of components is consistent throughout the application, with the same components having the same number in each of the drawings.

FIG. 1 shows a device for automatic drafting adjustment on a draw frame in interaction with a feeler roller pair, the rotary plate, and the can plate. The fiber sliver 4 is conveyed through the feeler roller pair 49 before the input of the draw frame. The feeler roller pair 49 determines the fiber sliver thickness. According to the schematic drawing, the fiber sliver 4 reaches the input roller pair 1, then the central roller pair 2 and the delivery roller pair 3. For the sake of clarity, only the lower roller which is primarily driven is shown in each instance. The three roller pairs (1, 2, 3) constitute a preliminary drafting zone and a main drafting zone. The fiber sliver 4 is conveyed on to a calender roller pair 50, goes from there into the sliver guiding channel 74 and is deposited via rotary plate 51 into can 55. Can 55 is standing on a can plate which rotates the can around its own axis.

The rotational speed ratios between the input roller pair 1 and the central roller pair 2 as well as between the central roller pair 2 and the delivery roller pair 3 are decisive for the mode of operation of the draw frame. In this connection, the rotational speed ratios between feeler roller pair 49 and input roller pair 1 as well as the rotational speed ratio between delivery roller pair 3 and calender roller pair 50 must, however, also be maintained. Also the rotational speed ratio between the rotary plate 51 or the can plate and the calender roller pair 50 must be maintained.

Figure 3:
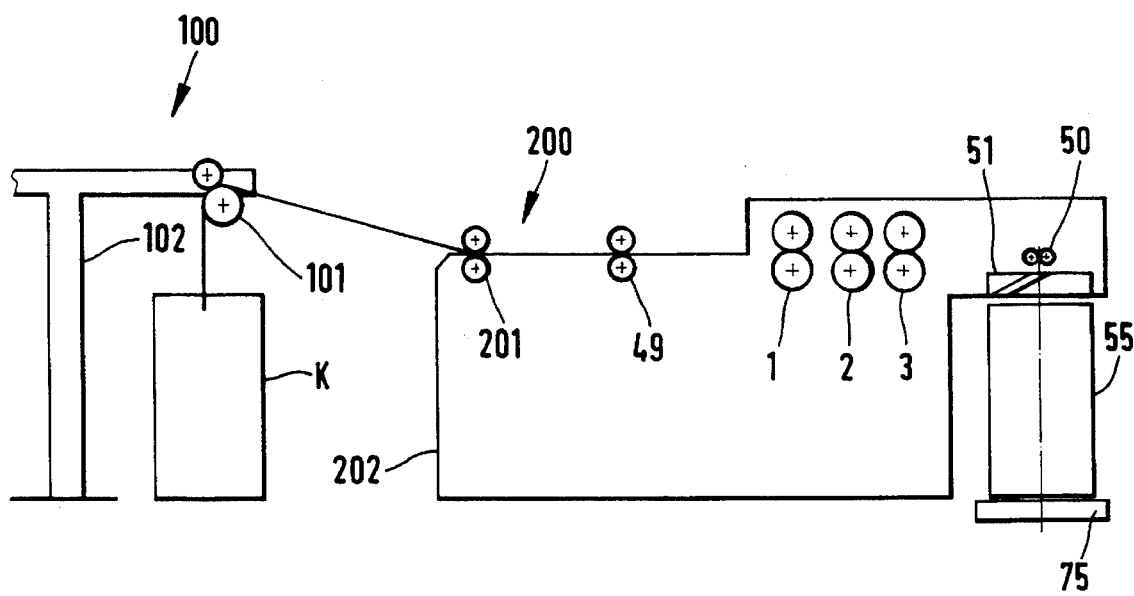
FIG. 3 shows a draw frame with operating elements.

FIG. 1 does not show the feed table with its roller pair as well as the feed frame with the corresponding roller pairs. These operating elements can also form rotational speed ratios to the other mentioned operating elements. They can therefore be included in the following considerations without having to be mentioned specifically. For a broader understanding, FIG. 3 shows a schematic representation of a feed frame 100 and a feed table 200 in their placement in relation to a feeler roller pair 49, to the roller pairs 1, 2, 3 of a draw frame, to the rotary plate 51 and to the can plate. The feed frame 100 is provided with roller pairs rotatably mounted on the machine frame 102 and corresponding to the number of presented cans K, such as e.g. roller pair 101 (in the present example only one roller pair is shown at a can K, but normally 6 to 8 roller pairs are associated with 6 to 8 cans K), said roller pairs being driven by a drive (not shown) for the conveying of fiber sliver from the cans K in the direction of the feed table 200. The feed table 200 is normally provided with a roller pair 201 which seizes the entering fiber slivers. This pair 201 can be driven by the machine drive. Following this roller pair, the fiber slivers are doubled over and are fed to the feeler roller pair 49 in the form of a fiber sliver 4. The operating elements of a draw frame are defined as the roller pairs at the feed frame, the roller pair or pairs on the feed table of the draw frame, the feeler roller pair, the roller pairs of the draw frame, the calender roller pair, the rotary plate, the can plate. This list can be amended by adding those operating elements which are added to the draw frame through addition or replacement. When flat cans are used for example, the can plate is replaced by a flat can traversing device.

The following considerations relate to FIG. 1. A main motor 5, which may be a low-cost motor, transmits its required power via a stepped pulley 56, belt 58 and stepped pulley 57 to shaft 18. The belt pulleys 19,20,21,22,23,24 are mounted on the shaft 18. In order to produce different orders of magnitude of force transmission, these belt pulleys can also be replaced by belt pulleys with different or other dimensions. This applies to all shown belt pulleys. The required power is further transmitted via belts 67,68,69,70, 71,72 to the belt pulleys 25, 26, 27, 28, 29 and 30. The latter belt pulleys are mounted on the drive shaft of the planet or cycloid gears. The details of this are shown in FIG. 2.

Figure 2:
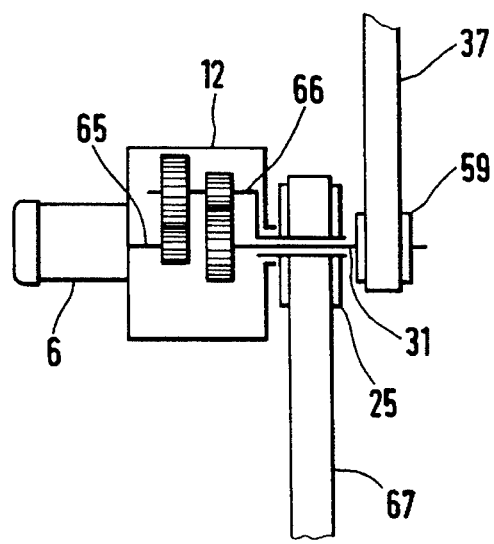
FIG. 2 shows individual planet or cycloid gears.

FIG. 2 is a detail from FIG. 1 and shows that the required power is transmitted via belt 67 to the belt pulley 25 which is coupled to the drive shaft of the planet or cycloid gear 12. The drive shaft in this case is the profiled shaft 66. The profiled shaft 66 transmits the required power via the toothed wheels to the drive shaft 31. The belt pulley 59 is mounted on the drive shaft 31 and transmits the required power via belt 37 to belt pulley 43, whereby the shaft of the latter is coupled to the shaft of the feeler roller pair 49. The servomotor 6 (which is a control servomotor) is coupled to the shaft of the sun gear 65, so that the required power of the control servomotor 6 may be superimposed on the required power which comes from the drive shaft 66. FIG. 2 shows that in particular the rotational speed transmitted via belt 67 to the drive shaft 66 can be superimposed by the rotational speed of the servomotor 6 which is transmitted via the shaft of the sun gear 65. A resulting rotational speed is obtained at the drive shaft 31. The servomotor 6 is able not only to change its own rotational speed continuously, but can also change its sense of rotation. This has its effect in the increase of rotational speed or decrease of rotational speed at the drive shaft 31.

This principle also applies to the operating mode between servomotor 7 and planet or cycloid gear 13, between servomotor 8 and planet or cycloid gear 14, between servomotor 9 and planet or cycloid gear 15, between servomotor 10 and planet or cycloid gear 16, and between servomotor 11 and planet or cycloid gear 17.

Consequently, the required power is also transmitted from the belt pulleys 60,61,62,63 and 64 via belts 38,39,40,41 and 42. The required power is further transmitted from the belt pulleys 44, 45, 46 to the input roller pair 1, the central roller pair 2 and the delivery roller pair 3 respectively.

The required power is transmitted from the belt pulley 48 to the calender roller pair 50. The belt pulley 47 transmits the required power to a belt pulley 52, whereby the rotary plate 51 is being driven via belt 73. At the same time the can plate 75 is rotated via gear 53 and a gear 54 around its axis so that the can 55 rotates around its own axis.

The total required power transmitted to the shown roller pairs of a draw frame is thus partially divided among the main motor 5 and several servomotors 6, 7, 8, 9, 10, 11 (which are identical to a control servomotor). The distribution of the required power is such that the main motor 5 delivers a constant required power which is the major portion of the total required power. The servomotors 6, 7, 8, 8, 10 and 11 which produce selectively variable required power produce together the lesser part of the entire required power.

This arrangement has a noticeably advantageous effect on the sizing and the cost of the electric motors to be used. The capacity share of the servomotors 6, 7, 8, 9, 10 and 11 becomes relatively small by comparison to the main motor 5. The required servomotors are therefore (even when compared to the classic "electric shaft") extremely low-cost and result in cost reduction in the driving of the draw frame.

Due to the coupling of the servomotors 6, 7, 8, 9, 10, 11 to the planet or cycloid gears 12, 13, 14, 15, 16, 17, low dynamic requirements are imposed on the individual servomotors, since load peaks are absorbed by the inertial mass of the corresponding planet or cycloid gear. The costs of the required planet or cycloid gears 12, 13, 14, 15, 16, 17 can also be kept low since the capacities to be transmitted are relatively low and the market offers very low-cost and nevertheless robust and reliable gearing with high effectiveness.

As FIG. 1 furthermore shows, the adjusting range of basic drafting is implemented externally via the servomotors 7,8,9 in combination with the planet or cycloid gears 13,14 and 15. The servomotors take over control and are therefore designated as control servomotors. This design of the adjustment ranges has the advantage that each servomotor is able to function in its full scale range. The precise basic transmission is determined by the arrangement of the mechanical overdrive. This has in turn the advantage that the set rotational speed ratio is maintained even in the event of rotational speed drops or load peaks as the disturbance takes effect to the same extent on all the roller pairs.

As can be seen in detail in FIG. 2, resolution is improved through the reduction of the rotational speed of the servomotor in relation to the power take-off speed of the planet gear, i.e. errors in rotational speed, i.e. ballistic effects, waviness, etc. in the rotational speed of servomotor 6 are reduced in accordance with the transmission ratio of 12. This results in greater precision in the maintenance of rotational speed, even though servomotors of a lower precision class are used.

Thanks to the degree of precision which can be attained between the roller pairs, automation can be increased to a very high degree. The adjustability of the rotational speed or of the rotational speed ratio between the roller pairs can be automatic during operation. It has also been shown to be advantageous that drafting can be adjusted without any problem on a draw frame in which the rotational speed ratio between two roller pairs following each other is kept very low. This, among other things, presented a problem in the past.

It will be apparent to those skilled in the art that various modifications and variations can be made in the present invention without departing from the scope or spirit of the invention. Thus, it is intended that the present invention cover such modifications and variations as come within the scope of the appended claims and their equivalents.

I claim:

1. A process for automatically adjusting the rotational speed ratios among rotating operating elements of a draw frame by controlling the total required power supplied to the operating elements, the required power effecting the rotational speed and torque of the operating elements, said process comprising the steps of:

providing two separate power capacities for each rotating operating element, one of the power capacities being delivered in a constant magnitude and the other capacity being delivered simultaneously in a selectively variable magnitude;

superimposing the selectively variable magnitude power capacity on the constant magnitude power capacity to achieve a resulting power capacity; and transmitting the resulting power capacity to the operating element wherein it is possible to automatically adjust the rotational speed ratio between operating elements by individually varying the selectively variable magnitude power capacity of respective operating elements while maintaining the constant magnitude power capacity constant for all operating elements.

2. The process as in claim 1, wherein the operating elements of the draw frame may include any of roller pairs, a rotary plate, and a rotating can plate, the constant magnitude power capacity being supplied from a main motor and the variable magnitude power capacity being supplied from individual servomotors configured with gearing arrangements associated with the individual operating elements.

3. The process as in claim 2, wherein a major portion of the resulting power capacity is from the constant power capacity supplied from the main motor.

4. The process as in claim 2, wherein the individual servomotors deliver selectively variable power capacities to the operating elements which is significantly less than the constant power capacity delivered from the main motor.

5. The process as in claim 2, including establishing a basic rotational speed ratio between the operating elements through selection of appropriate mechanical transmissions from the main motor to the gearing arrangements associated with the operating elements.

6. The process as in claim 5, including varying the speed ratios between the operating elements by adjusting the rotational speeds of individual operating elements through adjustment of the servomotors and associated gearing arrangements of the individual operating elements.

7. The process as in claim 2, including selecting the transmission ratio of the gearing arrangements of the individual operating elements so that the adjusting range of the associated servo motor is a multiple of the adjusting range of the rotational drive speed of the associated gearing arrangement.

8. The process as in claim 2, including selecting the transmission ratio of the gearing arrangements of the individual operating elements so that load changes on the operating elements have a feed-back effect upon the rotational speed of the servomotor that is proportional to the transmission ratio.

9. A control system for controlling the speed ratios between operating elements of a draw frame by varying the individual speeds of the operating elements, said system comprising:

individual variably controllable gearing arrangements associated with individual said operating elements, said gearing arrangements comprising drives and drive shafts operably connected to said individual operating elements for transmitting a total magnitude power capacity thereto;

a main motor, said main motor operably connected to said drives of said gearing arrangements for transmitting a constant magnitude power capacity thereto; and individual motors operably configured with each said gearing arrangement for transmitting a variable magnitude power capacity thereto, wherein said total magnitude power capacity comprises a superimposition of said variable magnitude power capacity with said constant magnitude power capacity.

10. The system as in claim 9, wherein said operating elements comprise any combination of roller pairs, rotary plates, and can plates, said gearing arrangements comprising planetary or cycloid type gearing arrangements having drives operably connected to said main motor and shafts operably connected to said individual motors wherein said variable magnitude power capacity it transmitted from said individual motors through said shafts.

11. The system as in claim 9, wherein said individual motors comprises servomotors.

12. The system as in claim 10, including mechanical transmissions between said main motor and drives of said gearing arrangements, said mechanical transmissions defining a basic rotational speed ratio between said operating elements, said basic rotational speed ration being individually varied at each said operating element by way of said individual motors.

13. The system as in claim 12, wherein the speed of rotation and direction of rotation of said individual motors is variable.

* * * * *